United States Patent

[11] 3,611,284

| [72] | Inventor | Jeffrey G. Lewis<br>Vancouver, Wash. |
|---|---|---|
| [21] | Appl. No. | 750,029 |
| [22] | Filed | Aug. 5, 1968 |
| [45] | Patented | Oct. 5, 1971 |
| [73] | Assignee | Jolley Construction Co., Inc.<br>Milwaukie, Oreg. |

[54] MOTION-SENSING DEVICE
12 Claims, 7 Drawing Figs.

[52] U.S. Cl. .................................................. 340/53,
188/2 A, 188/151 A, 303/21 BE, 340/62
[51] Int. Cl. ................................................. B60t 8/02
[50] Field of Search ........................................... 340/53,
262, 271; 303/21; 315/79

[56] References Cited
UNITED STATES PATENTS

| 740,547 | 10/1903 | Fiske | 340/271 |
| 2,190,682 | 2/1940 | Satterlee | 340/271 |
| 2,422,973 | 6/1947 | Martin | 340/271 |
| 2,980,369 | 4/1961 | Ruof | 340/53 X |
| 3,130,805 | 4/1964 | Carter et al. | 340/53 X |
| 3,233,946 | 2/1966 | Lockhart | 340/262 X |

Primary Examiner—John W. Caldwell
Assistant Examiner—H. Cohen
Attorney—Oliver D. Olson ABSTRACT: A rotary sensor wheel engages a moving part of a vehicle wheel and is coupled through a friction bearing to an actuator for an electric sensor switch which is closed by the actuator when the sensor wheel is rotating below a predetermined speed. The switch is in an electric control circuit for an electrically actuated device for relieving braking action on the vehicle wheel. A monitor wheel may be mounted for rolling contact with the road and is coupled through a friction bearing to an actuator for an electric monitor device associated with the control circuit for opening the latter when the monitor wheel is rotating below a predetermined speed greater than the said predetermined speed of the associated sensor wheel.

PATENTED OCT 5 1971 3,611,284
SHEET 1 OF 2
FIG. 1
FIG. 3
FIG. 4
FIG. 2
FIG. 5
JEFFREY G. LEWIS
INVENTOR.
BY Oliver Q. Olson
AGENT
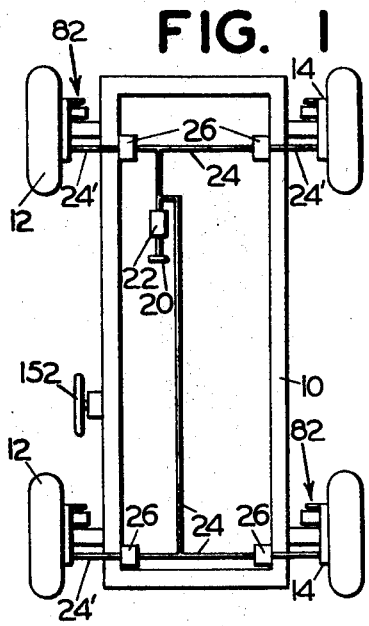
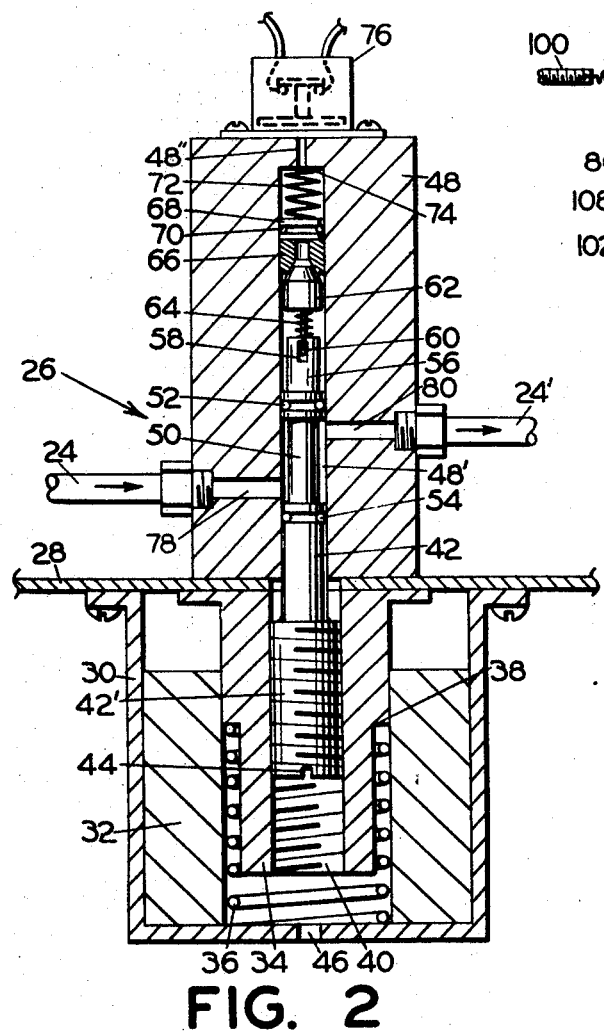
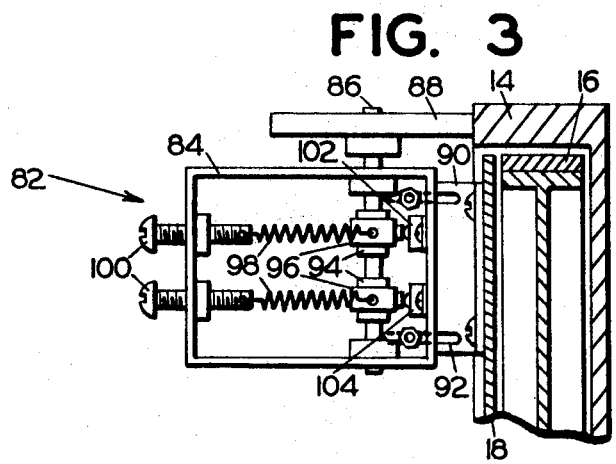
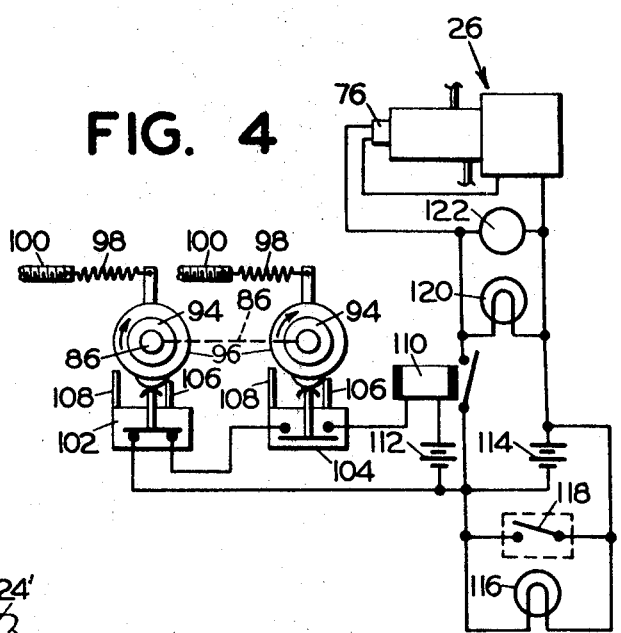
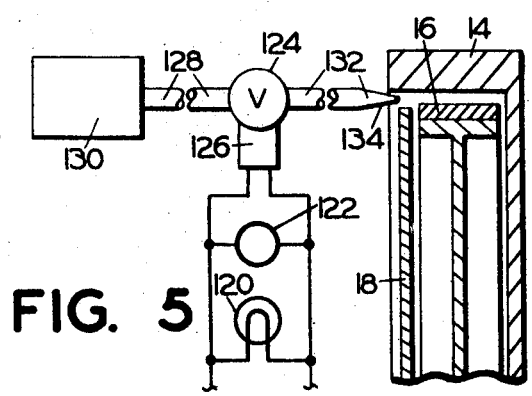

JEFFREY G. LEWIS
INVENTOR.

BY Oliver Q. Olson

AGENT

MOTION-SENSING DEVICE

BACKGROUND OF THE INVENTION

This invention relates to motion-sensing devices, and more particularly to a device for detecting variations in the speed of movement of a member and for using said detection to regulate said speed of movement.

There are many applications in which it is desirable to sense and/or to control the speed of movement of a movable member. Illustrative of such applications are industrial conveyor systems and rotary machinery. A particular application, by which the present invention is illustrated in the drawings and in the following description, is in land vehicle and aircraft braking systems, wherein it is desirable to have indication of and to automatically correct for misadjustment of the brakes to relieve the braking action of a skidding wheel.

Motion-sensing devices provided heretofore generally are characterized by complex and costly systems utilizing the motion of a movable member to generate an electric signal which is operable to give a physical, audible or visible warning of a malfunction. Prior devices intended to correct misadjustments of vehicle braking systems generally apply the correction to two or more wheels simultaneously. Thus, whereas, a single wheel may be the only one requiring adjustment, the correction is also made to other wheels which then become misadjusted.

SUMMARY OF THE INVENTION

In its basic concept, the present invention provides mechanical means by which the change of speed of a movable member from a predetermined magnitude effects movement of a sensing member to operate a switch in an electric circuit of a sensing device which functions to indicate the change of speed and/or to correct the change of speed.

It is by virtue of the foregoing basic concept that the primary objective of the present invention is achieved, namely to overcome the disadvantages of prior motion-sensing devices as enumerated hereinbefore.

Another important object of this invention is the provision of a motion-sensing device which is adapted for use on vehicles having fluid pressure braking systems associated with ground-engaging wheels, to correct for misadjustments of the individual wheel brakes and to minimize skidding which results from such misadjustments.

The foregoing and other objects and advantages of the present invention will appear from the following detailed description taken in connection with the accompanying drawings of the preferred embodiments.

BRIEF DESCRIPTION OF THE DRAWINGS

FIG. 1 is a plan view of an automobile frame and wheel assembly having incorporated with the braking system thereof a motion-sensing device embodying the features of the present invention.

FIG. 2 is a longitudinal sectional view of a fluid pressure control valve for use in the system of FIG. 1.

FIG. 3 is a fragmentary sectional view of a vehicle wheel brake assembly having incorporated therewith a sensing unit embodying features of the present invention.

FIG. 4 is a schematic diagram of an electric circuit incorporating the sensing unit of FIG. 3 and the valve of FIG. 2, for correcting misadjustment of a vehicle wheel brake.

FIG. 5 is a fragmentary, foreshortened view, partly in section, of alternative means for correcting misadjustment of vehicle wheel brake.

DESCRIPTION OF THE PREFERRED EMBODIMENTS

Figure 6:
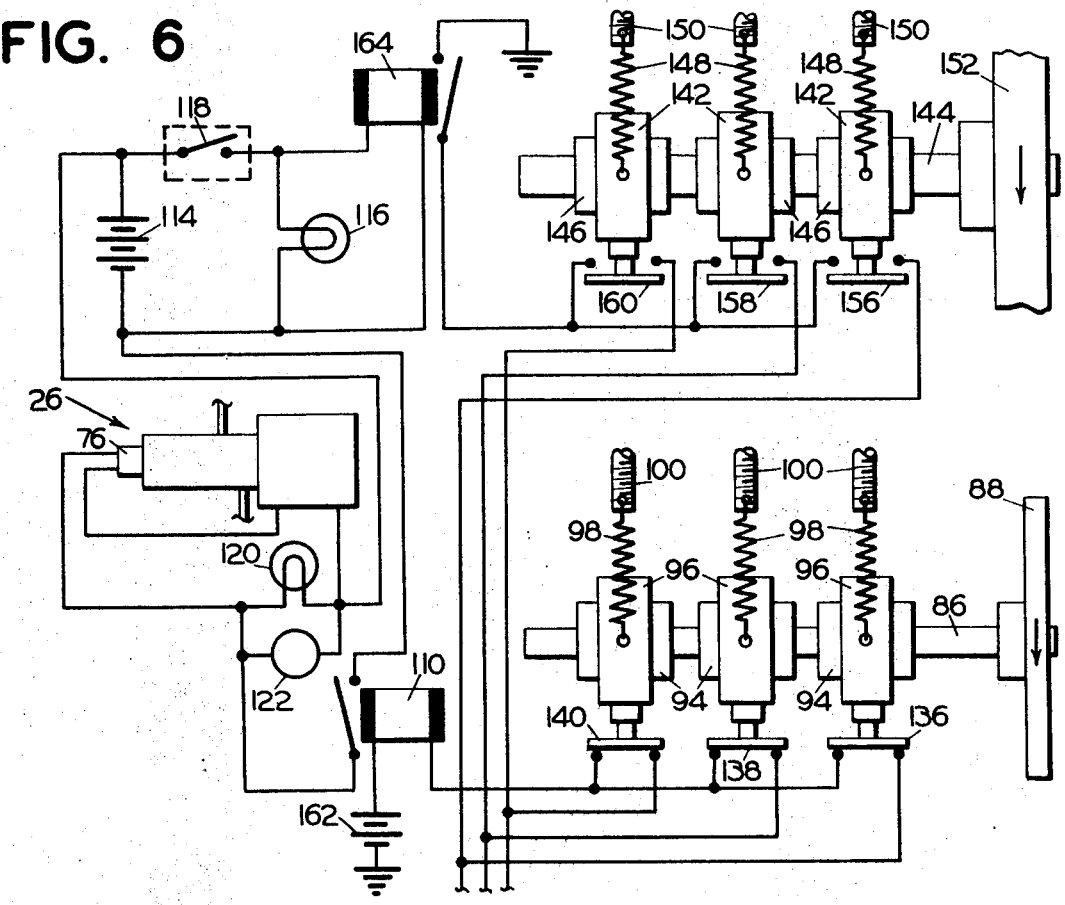
FIG. 6 is a schematic diagram of an electric circuit associated with other control components providing a modified system for correcting misadjustment of a vehicle wheel brake.

For purposes of illustration only, there is shown diagrammatically in FIG. 1 a vehicle frame 10 supported on wheels 12, each of which includes a brake drum 14 which mounts and rotates with the wheel. In FIGS. 3 and 5 there are shown associated with the drum a brakeshoe 16 mounted on a fixed wheelplate 18 for movement toward and away from the drum by means of a fluid pressure brake system. Although the present invention is adaptable for use with airbrake systems, the system illustrated in FIG. 1 is hydraulic. Thus, a brake pedal 20 functions to deliver hydraulic fluid from a master cylinder 22 under pressure through hydraulic conduits 24 to wheel cylinders (not shown) associated with each wheel.

In accordance with the present invention, there is interposed in the hydraulic conduits adjacent each wheel a solenoid-operated valve 26 shown in detail in FIG. 2. A mounting plate 28 supports a housing 30 in which is contained a solenoid coil 32. Movable longitudinally within the coil is the armature 34. The armature is urged resiliently forward by the surrounding coil spring 36 which abuts at its forward end against the shoulder 38 on the armature and at its rearward end against the housing.

The threaded bore 40 of the armature receives the threaded section 42' of the valve stem 42 by which the latter may be adjusted longitudinally relative to the armature.

A screwdriver slot 44 in the threaded end of the valve stem may be reached with a screwdriver inserted through the opening 46 in the housing.

The forward portion of the valve stem extends through an opening in the mounting plate and into the bore 48' of the valve body 48. The valve stem is provided with an intermediate segment 50 of reduced diameter, defined between the fluid pressure O-ring seals 52 and 54, and a terminal end segment 56 of reduced diameter forward of the seal 52. An elongated longitudinal opening 58 in the end segment slidably receives one end of a pin 60, the opposite end of which is secured to a valve member 62 confined slidably in the bore.

A coil spring 64 encircles the pin between the end segment of the valve stem and the valve member resiliently to urge them apart. The tapered end of the valve member is adapted to seal releasably against a hollow valve seat 66 secured in fixed position in the bore 48'.

On the side of the hollow valve seat opposite the valve member 62 is a piston 68, provided with a fluid pressure O-ring seal 70 and arranged for sliding movement longitudinally in the bore 48'. A coil spring 72 is interposed between the piston and the shoulder 74 of the bore, to urge the piston toward the hollow valve seat.

The reduced end portion 48' of the bore communicates with a normally closed, fluid pressure-actuated electric switch 76, the purpose of which is explained in detail hereinafter.

The valve body is provided with an inlet port 78 adapted to be connected to the fluid pressure conduit 24 from the master cylinder 22, and an outlet port 80 adapted to be connected to the fluid pressure conduit 24' connecting the associated wheel brake cylinder. The inlet and outlet ports communicate with the bore 48'.

In the deenergized position of the solenoid valve illustrated in FIG. 2 the inlet and outlet ports communicate with the annular space defined by the intermediate reduced secton 50 of the valve stem. Accordingly, fluid pressure from the master cylinder 22 is communicated freely to the wheel cylinder with which the valve is associated. However, upon energization of the solenoid the armature 34 is retracted further into the coil 32, carrying the valve stem 42 with it. The O-ring 52 thus is interposed between the inlet port 78 and the outlet port 80, preventing fluid pressure at the master cylinder from being impressed upon the wheel cylinder.

In this latter retracted position of the valve stem, the valve member 62 is unseated from the hollow valve seat 66 and the outlet port 80 thus is communicated with the piston 68. Fluid pressure at the outlet port thus reacts against the piston and moves the latter forward, against the resilience of the backing spring 72, forming a fluid pressure reservoir ahead of the piston. The reservoir thus serves to reduce the fluid pressure at the outlet port. This reduction in fluid pressure also is experienced at the wheel cylinder, with consequent retraction of the associated brakeshoes 16 and corresponding reduction in braking action of the vehicle wheel.

As the piston 68 moves forward the air trapped behind it in the area of the backing spring 72 increases in pressure. If desired, this air pressure may be utilized to activate the fluid pressure-actuated electric switch 76 to open the latter when the air pressure reaches an unsafe magnitude, reflecting excessively high fluid pressure at the outlet port 80. The electric switch is connected in series with the solenoid coil 32, whereupon opening of the switch deenergizes the coil and returns the vale stem to the position illustrated in FIG. 2. In the event the brake system is of the air pressure type, the piston 68 may be eliminated, together with the backing spring 72 and fluid pressure switch 76, thereby allowing air pressure at the outlet port 80 to be exhausted to the atmosphere when the solenoid valve is activated.

Referring now particularly to FIG. 3 of the drawings, there is illustrated a sensor unit 82 which includes a housing 84, (the top is omitted to expose the interior). A sensor wheel shaft 86 is mounted in bearings supported by the housing and extends through the latter. The projecting end of the shaft mounts a sensor wheel 88 for rotation therewith.

The housing of each sensor unit is mounted on a bracket 90 secured removably to the fixed wheelplate 18 of the associated vehicle wheel. Elongated slots 92 in the bracket receive securing bolts extending through the housing to permit adjustment of the sensor wheel 88 for proper frictional engagement with the confronting face of the brakedrum 14. The sensor wheel preferably is made of soft rubber to allow for irregularities in the confronting face of the brakedrum, during rotation of the latter.

With the housing the sensor wheel shaft 86 mounts a pair of friction bearings 94, each of which supports an electric switch actuator 96. The friction bearing serves to couple together the sensor wheel shaft and switch actuator frictionally for simultaneous or independent rotation. A resilient spring 98 is connected at one end to each actuator and at the opposite end to a threaded adjustment screw 100 supported by the housing 84. The spring serves to resist resiliently the rotation of the actuator with the sensor wheel shaft, and the magnitude of such resilient resistance is made variable by the adjustment screw. Accordingly, the sensor wheel shaft must attain a certain rotational speed before the actuator will rotate with it.

Associated with the actuators are the electric microswitches 102 and 104, respectively, mounted in the housing. Each actuator includes a cam lobe which, upon rotation of the actuator, releasably engages the pushbutton of the associated microswitch.

Referring now to FIG. 4 of the drawings, the cam lobe of one actuator is shown depressing the pushbutton of the microswitch 102 to maintain the latter closed, whereas the cam lobe of the other actuator is in position depressing the pushbutton of the microswitch 104 to maintain the latter open. These are the positions prevailing when the vehicle is stopped, the resilient springs 98 urging the actuators to their counterclockwise limit of rotation against the stops 106. The other stops 108 serve to limit the degree of clockwise rotation of the actuators against the resistance of the springs, sufficient to prevent the microswitches 102 and 104 from transferring to the open and closed positions, respectively.

The microswitches are arranged in series in an electric circuit which includes the control relay coil 110 and the source 112 of electric potential. The latter, preferably, is a low-voltage battery.

The normally open contact of the relay 110 is included in an electric circuit for the coil 32 of the solenoid valve 26. In the embodiment illustrated, this circuit includes the vehicle battery 114 which also supplies electric potential for the vehicle stoplights 116 through the conventional fluid pressure stoplight switch 118.

Arranged in parallel with the coil 32 of each solenoid valve may be an alarm, such as an indicator light 120 or a buzzer 122, or both, to give visible and audible indication to the driver that one or more of the associated vehicle wheels is skidding and that the misadjustment of the brakes is being corrected by operation of the solenoid valves.

It will be apparent that the alarm indicators may be eliminated. It will be further apparent that if it is desired merely to identify which wheel is skidding, without correcting the misadjustment, the associated solenoid valves may be omitted and only the indicator lights 120 employed.

To illustrate the operation of the system illustrated in FIGS. 3 and 4, let it be assumed that each of the four wheels of the vehicle has associated with it one of the sensor units 82 and solenoid valves 26, as illustrated in FIG. 1. Let it be further assumed that the adjustment screw 100 associated with the actuator 96 for microswitch 102 is adjusted so that the actuator will be caused to rotate clockwise with the sensor wheel shaft when the latter reaches a speed corresponding to a vehicle speed of 40 miles per hour. Let it also be assumed that the adjustment screw associated with the actuator for microswitch 104 is adjusted so that the actuator will rotate clockwise with the sensor shaft when the latter reaches a speed corresponding to a vehicle speed of 10 miles per hour.

Accordingly, with the vehicle traveling, for example, at 60 miles per hour, the microswitch 102 is open and the microswitch 104 is closed. The relay 110 being deactivated, the solenoid valve 26 is in the position illustrated in FIG. 2 and the brakes may be operated in the normal manner.

Let it now be assumed that the driver applies the vehicle brakes and that the brakes associated with one of the wheels is misadjusted sufficiently to cause that wheel to skid. The corresponding reduction in rotation of the associated brakedrum 14 results in a corresponding reduction in rotation of the sensor wheel 88 and connected sensor shaft 86. Assuming the reduction in speed of the sensor shaft corresponds to a vehicle speed of less than 40 miles per hour, but greater than 10 miles per hour, the actuator associated with microswitch 102 is caused to rotate counterclockwise, by action of the spring 98, to close the microswitch. Since the other microswitch 104 also is closed, the relay 110 is energized and the solenoid valve 26 is activated, together with the indicators 120 and 122. The visible alarm identifies for the driver which wheel is skidding.

Upon activation of the solenoid valve, the valve stem 42 is retracted, and the O-ring seal 52 seals the inlet port 78 from the outlet port 80 to prevent further braking pressure being applied to the misadjusted brake. Further, since the valve stem has been retracted, the valve member 62 unseats from the seat 66 allowing the excessive fluid pressure at the wheel cylinder to be relived into the reservoir as said excessive pressure causes the piston 68 to move away from the seat 66 against the resistance of the spring 72.

When the brake cylinder pressure is relieved sufficiently to eliminate skidding of the wheel, the increased speed of the associated sensor shaft 86 will, assuming the vehicle is still traveling at a speed greater than 40 miles per hour, effect clockwise rotation of the actuator associated with microswitch 102, once again to open the microswitch and deenergize the solenoid valve 26. If the braking pressure applied by the driver still is sufficient to again cause the wheel to skid, the foregoing cycle will be repeated. Accordingly, the vehicle will be braked progressively under alternate conditions of skidding and nonskidding, until the vehicle reaches a speed of less than 40 miles per hour, or whatever other speed the actuator has been set to operate by its associated adjustment screw. From that speed down to the exemplified speed of 10 miles per hour to which the actuator for microswitch 104 has been set, the solenoid valve will remain energized and nonskidding braking will prevail. When the vehicle reduces speed below 10 miles per hour, opening of the microswitch 104 deenergizes the solenoid valve and returns complete control of braking operation to the driver.

FIG. 5 illustrates an alternative means for relieving the braking action of a skidding wheel in place of the use of the solenoid valve 26 to relieve baking pressure. Thus, a conventional solenoid valve 124 is employed, its coil 126 being connected in the electric circuit of the vehicle battery 114, contact of relay 110 and alarms, in similar manner to that of the solenoid valve coil 32 illustrated in FIG. 4. The inlet of the valve 124 is connected through conduit 128 to a source 130 of volatile liquid, such as water, acetone, methanol, etc. The outlet of the valve is connected to a liquid conduit 132 which terminates in a nozzle 124 positioned between the wheelplate 18 and brakedrum 14 so as to deliver the volatile liquid to the space between the brakeshoes 16 and the brakedrum.

Accordingly, when the misadjusted brake causes skidding of the associated wheel, the solenoid coil 126 is energized, the valve 124 is moved to interconnect its inlet and outlet, and volatile liquid is ejected against the brakedrum between the circumferentially spaced brakeshoes. The liquid functions to decrease the frictional contact between the brakedrum and the brakeshoes and thus to decrease the braking action sufficiently to relieve the skidding. Similar to the intermittent operation of the fluid pressure-controlling solenoid valve 26, the volatile liquid is ejected against the brakedrum intermittently. As the liquid evaporates the braking action increases in magnitude, as will be apparent.

FIG. 6 illustrates an arrangement by which the braking action may be controlled through successive stages of vehicle speed. Each sensor wheel shaft 86 mounts a plurality of switch actuators 96 adjusted to open the associated microswitches 136, 128 and 140 at different vehicle speeds. In the embodiment illustrated, three such actuator and switch assemblies are provided.

Associated with each sensor switch and actuator assembly is a monitor switch and actuator assembly. That is to say, each monitor switch actuator 142 is coupled to the monitor shaft 144 by means of a friction bearing 146 and is urged resiliently in the direction opposite the rotation of the shaft 144 by means of a spring 148 and associated adjustment screw 150. The monitor shaft is driven by a monitor wheel 152 secured thereto. The monitor unit is mounted on the vehicle (FIG. 1) for rolling engagement of the monitor wheel 152 with the road. Accordingly, the operation of the monitor wheel reflects the actual speed of movement of the vehicle.

The monitor microswitches 156, 158 and 160 are paired each with one of the sensor microswitches 136, 138 and 140, respectively, and are associated with the monitor actuators such that the latter effect opening of the switches below predetermined rotational speeds of the monitor shaft, which speeds are slightly greater than the predetermined speeds of the sensor shaft 86 which effect closing of the paired sensor microswitches. For example, if the sensor actuators 96 are adjusted to effect closure of the associated sensor microswitches 136, 138 and 140 at sensor shaft rotation speeds corresponding to vehicle wheel speeds of 30, 50 and 70 miles per hour, respectively, the monitor actuators 142 associated with the monitor microswitches 156, 158 and 160 may, for example, be adjusted to effect opening of the monitor microswitches at monitor shaft rotation speeds corresponding to actual vehicle speeds of 33, 53 and 73 miles per hour, respectively.

The associated pairs of sensor and monitor microswitches are connected in parallel, and each pair is connected in series in an electric circuit which extends from common ground through a battery source 162 of electric potential, preferably of low voltage, thence through the coil of the sensor control relay 110 through said series-connected microswitches and the normally open contact of the brake control relay 164 to said common ground. The coil of the brake control relay is connected across the vehicle battery 114, parallel with the vehicle stoplights 116, through the conventional fluid pressure brake switch 118. Thus, the brake control relay is energized upon actuation of the brake pedal of the vehicle. The contact of the sensor relay 110 is arranged in the electric circuit of the vehicle battery 114 to control the operation of the solenoid valve 26 and alarms 120 and 122, in the manner illustrated in FIG. 4.

In the operation of the system illustrated in FIG. 6, assuming the sensor and monitor actuators to be adjusted to the values exemplified hereinbefore, let it be assumed that the vehicle is traveling at 80 miles per hour when the driver applies braking pressure to the brake pedal sufficient to cause a misadjusted brake to effect skidding of its associated vehicle wheel. Let it be assumed that the rotation of the skidding wheel reduces the rotational speed of the sensor shaft below 70 miles per hour but above 50 miles per hour. Accordingly, the sensor microswitch 140 will be caused to close. Since the associated monitor switch 160 is closed at this vehicle speed, the electric circuit of the sensor control relay 110 is completed, its contact is closed and the solenoid valve 26 and alarm are energized. Activation of the solenoid valve relieves the braking pressure at the misadjusted wheel, whereupon the skidding condition of the wheel is eliminated.

With the return of the formerly skidding wheel to normal condition, the associated sensor shaft 86 increases its rotational speed. If the vehicle still is traveling at a speed greater than 73 miles per hour, the sensor actuator 96 will again effect opening of the sensor microswitch 140. The sensor control relay 110 thus is deactivated and its associated contact is opened, deenergizing the solenoid valve 26 and alarms. Upon deactivation of the solenoid valve, excessive braking pressure once again is applied to the wheel brake cylinder and skidding once again occurs. The sensor actuator thus again closes the sensor microswitch 140 once more to relieve the skidding condition of the wheel.

The foregoing sequence of operation is repeated as often as is necessary, until the vehicle speed is reduced below 73 miles per hour, at which time the monitor microswitch 160 remains open. Upon the next occurrence of skidding of the misadjusted vehicle wheel, reducing the rotation of the sensor shaft 86 to a speed below 50 miles per hour, the sensor actuator effects closure of the sensor microswitch 138. The circuit of the sensor control relay 110 thus is completed through said microswitch and the associated monitor microswitch 158, once again to relieve the skidding condition of the wheel.

Accordingly, it will be apparent that the system illustrated in FIG. 6 functions intermittently to relieve the skidding condition of a misadjusted wheel brake progressively during deceleration of the vehicle through a substantial range of speed, to bring the vehicle to a stop in a minimum distance and with minimum loss of control.

Figure 7:
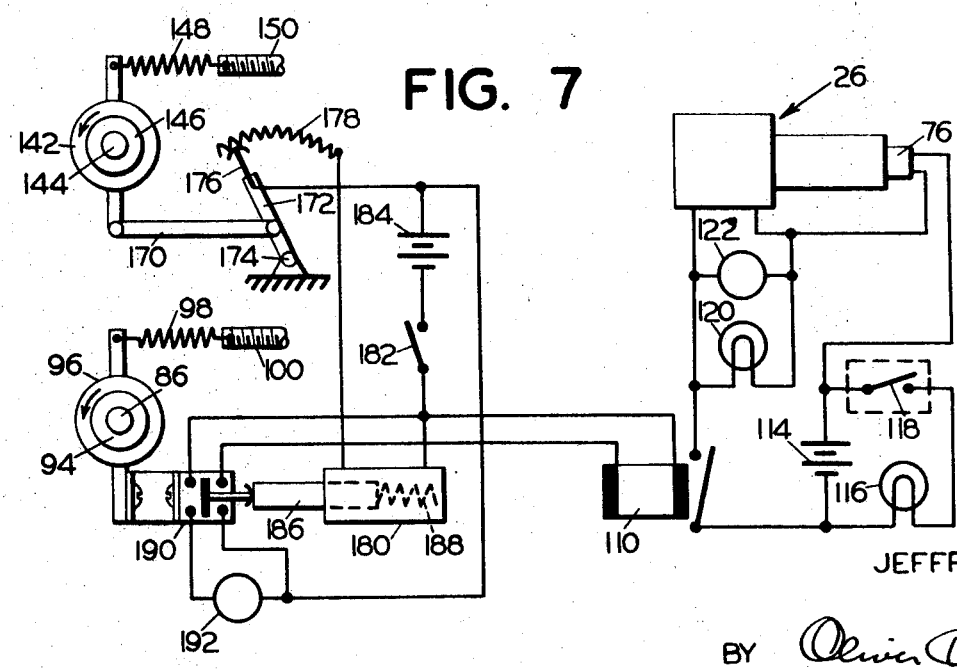
FIG. 7 is a schematic diagram of an electric circuit forming with additional components a still further modified form of system for correcting misadjustment of a vehicle wheel brake.

In the system illustrated in FIG. 7, the monitor switch assembly illustrated in FIG. 6 is replaced by a single monitor actuator 142 operated by the monitor wheel 152 through the friction bearing 146 coupling to the monitor shaft 144. The actuator is connected pivotally through a link 170 to an arm 172 mounted pivotally at one end by the pivot pin 174 to the housing of the monitor unit. The arm is of electrically nonconductive material and supports at the end opposite the pivot pin an electrically conductive movable contact 176 of a voltage divider resistance member 178. The contact and resistance member are connected in series with a solenoid coil 180 and the vehicle ignition switch 182 across a source 184 of electric potential, preferably a low-voltage battery.

The armature 186 of the solenoid coil is urged resiliently outward with respect to the coil by such means as the spring 188, and its outer end is arranged for engagement with the pushbutton of the sensor microswitch 190. The microswitch body is mounted on the single sensor actuator 98 which is operated by the sensor wheel 88 through the friction bearing 94 coupling it to the sensor shaft 86.

One pair of normally open contacts of the sensor microswitch 190 is arranged in an electric circuit which extends from the negative terminal of the battery 184 through said normally open contacts and the coil of the control relay 110, thence through the ignition switch 182 to the positive battery terminal. The normally open contact of the relay 110 is connected in the electric circuit of the vehicle battery 114, the solenoid valve 26 and alarms, as illustrated in FIG. 4.

A second normally open pair of contacts of the sensor microswitch 190 is connected in an electric circuit which extends from the negative terminal of the battery 184 through a wheel spin indicator 192, which may be an electric lamp, buzzer, or other suitable indicator, thence through said contacts and the vehicle ignition switch 182 to the positive battery terminal. The spin indicator functions in the manner described in detail hereinafter.

In the operation of the system illustrated in FIG. 7, let it be assumed that the vehicle is at rest with the ignition switch closed. The monitor actuator 142 is urged resiliently to its maximum position of counterclockwise rotation relative to the monitor shaft, by means of the spring 148 and adjustment screw 150, thereby placing maximum resistance of the voltage divider member 178 in the electric circuit of the solenoid coil 180. The solenoid armature 186 thus is extended outward to its maximum limit by the backing spring 188, the outer end of the armature engaging the pushbutton of the microswitch 190 to open both pairs of contacts. The control relay 110 thus being deenergized, the solenoid valve 26 is deactivated for normal operation of the vehicle braking system, as previously explained.

As the vehicle moves forward at progressively increasing speeds the monitor actuator is rotated counterclockwise, pivoting the movable member 176 of the voltage divider clockwise to reduce the resistance of the latter and pull the solenoid armature 186 proportionately inward with respect to its coil, against the resistance of the resilient spring 188. Simultaneously, the sensor actuator 96 is rotated counterclockwise against the resistance of the spring 98, to move the body of the sensor microswitch toward the armature. These movements are substantially equal, whereupon the pairs of contacts of the sensor microswitch remain open.

If the driver of the vehicle now applies brake pressure to a misadjusted wheel brake, causing the wheel to skid, the reduced rotation of the wheel results in clockwise rotation of the sensor actuator 96. This movement of the actuator causes retraction of the body of the sensor microswitch 190 relative to the solenoid armature 186 and results in closure of the pair of contacts in the electric circuit of the control relay 110. Activation of the latter completes the electric circuit of the solenoid valve 26 and alarms, with consequent relief of braking fluid pressure at the skidding wheel. The monitor actuator spring 148 is adjusted by the adjustment screw 150 to provide the intermittent operation of the solenoid valve 26 as in the previously described embodiment illustrated in FIG. 6.

The system illustrated in FIG. 7 also may be utilized to advantage on drag-racing vehicles, to provide indication to the driver that the driving wheels of the vehicle are spinning excessively during acceleration. This indication is provided by the spin indicator 192, as follows: If the driver attempts to accelerate too fast, causing the driving wheels to spin in the forward direction, the sensor actuator 96 will be caused to rotate counterclockwise to a greater degree than the monitor actuator 142. The sensor microswitch body 190 thus is moved further toward the solenoid armature 186, which engages the microswitch pushbutton, thereby effecting closure of the pair of contacts in the electric circuit of the spin indicator 192. This indicator thus serves to inform the driver of the spinning condition of the driving wheels, which the driver may correct by easing off on the accelerator.

Various modifications and changes may be made in the systems described hereinbefore. For example, a single sensing unit may be mounted for engagement of its sensing wheel with the rotary drive shaft of a vehicle for controlling simultaneously the braking action of both rear wheels, or both front wheels, or all four wheels. Suitable modifications may be made to accommodate the use of the systems with airplane landing gear, trucks, trailers, motorcycles and other types of vehicles. The electric circuit controlled by the sensing microswitch may function to operate various types of electrically actuated sensing devices other than the solenoid valves and alarms previously described. For example, the circuit may be employed to control electrically actuated door locks, conveyor feeders and many other devices. The number of sensor and monitor actuators and associated microswitches may be varied as desired to accommodate particular installations and operations.

Having now described my invention and the manner in which it may be used, I claim:

1. A device for sensing the change of speed of a movable member from a predetermined speed of movement, comprising
   a. a support,
   b. a rotary sensor wheel adapted to be mounted to engage the movable member and to be rotated by movement of the latter,
   c. a sensor wheel shaft journaled on the support and mounting the sensor wheel for rotation therewith,
   d. sensor means,
   e. sensor control means,
   f. sensor control actuator means mounted adjacent the control means and movable between positions which adjusts the control means to alternate conditions of operation,
   g. friction means mounting the actuator means on the sensor wheel shaft for movement to one of said positions by rotation of the shaft, and
   h. adjustable resilient means interengaging the support and actuator means for resiliently resisting rotation of the actuator means by the shaft to said one position until the shaft reaches a speed of rotation predetermined by adjustment of the resilient means, whereby to effect operation of the sensor means at various predetermined speeds of rotation of the shaft.

2. The device of claim 1 wherein the friction means mounting the actuator means comprises friction bearing means interengaging the actuator means and the shaft, and the resilient means engages the actuator means for moving the latter to one of said positions when the shaft rotation is less than said predetermined speed.

3. The device of claim 1 wherein the sensing means comprises an alarm.

4. The device of claim 1 wherein the movable member is a rotary vehicle wheel provided with relatively movable brake members operable by a fluid pressure supplied through a fluid pressure conduit, and wherein the sensor means comprises a solenoid-operated valve in said conduit having an inlet communicating with the source of fluid pressure and an outlet communicating with the wheel brake, and operable upon activation of the solenoid to seal the inlet and outlet from each other and to vent the outlet to relieve fluid pressure at the wheel brake.

5. The device of claim 4 including a fluid pressure reservoir in the valve, and valve means operable by activation of the solenoid to communicate the outlet with the reservoir to receive therein fluid pressure from the wheel brake.

6. The device of claim 5 including fluid pressure responsive safety switch means communicating with the reservoir and arranged in the electric circuit of the solenoid to deactivate the latter at a predetermined elevated fluid pressure in the reservoir.

7. The device of claim 1 wherein the movable member is a rotary vehicle wheel provided with relatively movable brake members operable by fluid pressures applied through a fluid pressure conduit and wherein the sensor means comprises
   a. a solenoid-operated valve having an inlet and an outlet, and
   b. a source of volatile liquid connected to the valve inlet,
   c. the outlet communicating with the space between the relatively movable brake members,
   d. the valve being operable upon activation of the solenoid to dispense said liquid from the source into said space to relieve braking operation.

8. The device of claim 1 wherein the movable member is a rotary vehicle wheel provided with relatively movable brake members operable by fluid pressure supplied through a fluid pressure conduit, and including
 a. a monitor wheel adapted to be mounted on the vehicle for rolling engagement with the road,
 b. a monitor wheel shaft mounting the monitor wheel and rotatable therewith, and
 c. electric circuit control means associated with the said electric circuit and operable by rotation of the monitor wheel shaft at a predetermined speed greater than said predetermined speed of the sensor wheel shaft to deactivate said electric circuit.

9. The device of claim 8 wherein the electric circuit control means comprises
 a. electric monitor switch means in said electric circuit in series said sensor switch means,
 b. monitor switch actuator means mounted adjacent to the monitor switch means and movable between positions opening and closing said switch means, and
 c. means mounting the monitor switch actuator means on the monitor wheel shaft for movement by rotation of the latter to effect closing and opening of the circuit while the monitor wheel shaft rotates above and below, respectively, a predetermined speed greater than said predetermined speed of rotation of the sensor wheel shaft.

10. The device of claim 8 wherein the electric circuit control means comprises
 a. an electric solenoid including a coil having an electric circuit and an armature movable relative to the coil in proportion to the magnitude of electric potential applied to the coil, and
 b. voltage divider means in said electric circuit and having movable means engaging said monitor wheel shaft and movable by the latter to vary said electric potential in proportion to the speed of rotation of the monitor wheel shaft,
 c. said armature being releasably engageable with the sensor switch means to move the latter to adjust the opening and closing thereof.

11. The device of claim 10 including
 a. an electric wheel spin indicator having an electric circuit, and
 b. second sensor switch means in the electric circuit of the spin indicator and movable by the armature and sensor wheel shaft to complete said circuit and activate the indicator when an associated vehicle wheel rotates faster than the forward movement of the vehicle.

12. The device of claim 1 wherein
 a. the sensor means is electrically actuated,
 b. the control means is electric switch means in an electric circuit with the sensor means, and
 c. the actuator means is operable to open and close said switch means.